United States Patent
Null et al.

(10) Patent No.: US 7,122,976 B1
(45) Date of Patent: Oct. 17, 2006

(54) LIGHT MANAGEMENT SYSTEM DEVICE AND METHOD

(75) Inventors: Jonathan Null, San Jose, CA (US); Melissa Lynn Smith, Burlingame, CA (US); Thomas James Beyer, Sunnyvale, CA (US)

(73) Assignee: The Watt Stopper, Santa Clara, CA (US)

( * ) Notice: Subject to any disclaimer, the term of this patent is extended or adjusted under 35 U.S.C. 154(b) by 0 days.

(21) Appl. No.: 11/084,449

(22) Filed: Mar. 18, 2005

Related U.S. Application Data

(63) Continuation-in-part of application No. 10/255,659, filed on Sep. 25, 2002, now Pat. No. 6,888,323.

(51) Int. Cl.
G05B 13/02 (2006.01)
G05F 1/00 (2006.01)

(52) U.S. Cl. .................. 315/362; 315/312; 315/313; 315/294; 340/540; 340/541

(58) Field of Classification Search ............... 315/159, 315/154, 360, 307, 294, 158, 361, 362, 291, 315/295, 312; 340/540, 541
See application file for complete search history.

(56) References Cited

U.S. PATENT DOCUMENTS 5,946,209 A * 8/1999 Eckel et al. .............. 700/14
6,151,529 A * 11/2000 Batko ....................... 700/28
6,909,239 B1  6/2005 Gauna ....................... 315/134

OTHER PUBLICATIONS

"SensorLite WSD-NL", © Sensor Switch, Inc., Jan. 18, 2005, 2 pages.
"Customer Advanced Technologies", www.smud.org/education/cat/index.html, 3 pages.
"Energy Efficient & Customer Research & Development Technology Brief . . . Smart Vanity Lighting System", SMUD, 2 pages.

* cited by examiner

Primary Examiner—Thuy V. Tran
Assistant Examiner—Chuc Tran
(74) Attorney, Agent, or Firm—Haverstock & Owens LLP

(57) ABSTRACT

A lighting control system is disclosed. The lighting control system is electrically coupled to a load circuit for controlling indoor and/or outdoor lighting. The lighting control system includes a control module with a night light for providing low-level night light illumination and one or more sensors for operatively controlling the indoor and/or outdoor lighting and the night light in response to measured light levels and/or detected motion. The system is preferably configured to provide low-level night light from the night light when measured light levels and detected motion are below threshold values and to automatically turn on the indoor and/or outdoor lighting and simultaneously turn off the night light when measured light levels and detected motion are above the threshold values.

17 Claims, 8 Drawing Sheets

400

|  | Load | Nightlight | Time Delay | Daylight | Function |
|---|---|---|---|---|---|
| Mode 1 | Manual On | Automatic | 1 Hour | N/A | When load is on, nightlight is off |
| --- | Manual On | Automatic | 2 Hour | N/A | When load is on, nightlight is off |
| --- | Manual On | Automatic | 0.5 Hour | N/A | When load is on, nightlight is off |
| --- | Manual On | Automatic | 0.25 Hour | N/A | When load is on, nightlight is off |
| Mode 2 | Automatic On | Automatic | 0.25 Hour | N/A | When load is on, nightlight is off |
| Mode 3 | Manual On | Automatic On | XX Hour(s) | N/A | Nightlight turns on based on occupancy but load is a manual on function, Time delay is same for both |
| Mode 4 | Automatic On | Automatic On | XX Hour(s) | N/A | If ambient light level in room is above a set limit, the load and nightlight are held off until light level falls below limit |
| Mode 5 | Any Combination of above | Any Combination of above | Any Combination of above | Any Combination of above | Any Combination of above |

401 (rows 1-4), 403 (row 5), 405 (row 6), 407 (row 7), 409 (row 8)

Fig. 4

LIGHT MANAGEMENT SYSTEM DEVICE AND METHOD

RELATED APPLICATION(S)

This application is a Continuation-in-Part Application of the application Ser. No. 10/255,659, entitled "LIGHT MANAGEMENT SYSTEM DEVICE AND METHOD", filed Sep. 25, 2002 now U.S. Pat. No. 6,888,323. The application Ser. No. 10/255,659, entitled "LIGHT MANAGEMENT SYSTEM DEVICE AND METHOD", filed Sep. 25, 2002 is hereby incorporated by reference.

FIELD OF THE INVENTION

The invention relates to light management systems, devices and method. More particularly, the present invention relates to light management systems and devices for and methods of automatically and manually controlling a load circuit with room lights.

BACKGROUND OF THE INVENTION

A number of different light management systems are known. One type of light management system utilizes a motion detector or sensor. In such systems, room lights are turned off, turned on and/or are dimmed according to a detected level of motion within the room.

There is a continual push to reduce energy consumption, because of rising energy costs and negative environmental impacts of energy usage and energy generation. Therefore, there is a need for improved light management systems, devices and methods which help to conserve energy.

SUMMARY OF THE INVENTION

The present invention is directed to a device and system for and method of controlling a load circuit, such as a load circuit coupled to a room light. A system, in accordance with the embodiments of the invention comprises a switch unit for coupling to the load circuit. The switch unit is preferably configured to replace a standard light switch and secure to an electrical receptacle box on a wall.

The switch unit preferably has a manual switch for manually controlling the room light through the load circuit. The manual switch is preferably a momentary switch, which herein describes a touch switch that is depressed to change the operation of the switch unit and then returns to its original position. However, it is understood that any other type of switch for manually controlling the room light through the load circuit, such as a rheostat, a toggle or a flip switch are considered to be within the scope of the present invention. The switch unit also has a light unit, also referred to herein as a night light, for emitting low level room light when the manual switch opens the load circuit to turn the room light off, or when current that is drawn through the load circuit reaches a predetermined value.

In a preferred embodiment of the invention, the switch unit has a motion sensor, wherein the motion sensor is configured to instruct the switch unit to adjust room lighting by adjusting the level of light emitting from the room light, the night light or both, based on a level of detected motion within an area around the switch unit. For example, when no motion is detected by the motion sensor in the area around the switch unit, then the sensor, after a time delay, instructs the switch unit to dim the room light, dim the night light, shut the room light off, shut the night light off or a combination thereof. Likewise, when the motion detector detects motion within the area around the switch unit, then the motion sensor instructs the switch unit to increase the level of room lighting by turning the room light on, turning the night light on, brightening the room light, brightening the night light or a combination thereof.

Preferably, the switch unit has a micro-processor for programming modes of operation, including setting the time delay value for when the room light and/or night light are shut off or dimmed in the absence of detected motion. Preferably, the micro-processor is programable through an internal dip switch, the manual switch or a combination thereof. For example, during the installation of the switch unit, a technician actuates the internal dip switch to place the switch unit in program mode. Then the technician can toggle through options, including automatic operation or manual operation of the room light and automatic or manual operation of the night light. In yet further embodiments, the switch unit is programmable to have the room lights and/or the night light turn on and/or off based on the time of day. For example, the switch unit is programmable to have the night light capabilities only during the hours of 6:00 PM to 6:00 AM.

In a preferred embodiment of the invention, the manual switch of the switch unit is a momentary switch with the night light and the motion detector integrated into the momentary switch. The motion sensor is preferably an infrared motion sensor and the night light preferably comprises light emitting diodes (LEDs). In this preferred embodiment, dimming the night light is accomplished by providing a pulsed current to the LEDs, such that the LEDs shut on and off to give an apparent dimming effect. Alternatively, or in addition to providing a pulsed current, dimming the night light is accomplished the by disabling one or more of the light emitting diodes.

In accordance with still further embodiments of the invention, the switch unit has a light detector for measuring a level of room lighting. The light sensor is preferably configured to turn on, turn off, and/or dim the room light and/or the night light based on a level of detected room lighting. For example, if the load circuit is open and the night light is on, when the light sensor detects that there is a sufficient level of room lighting coming from, for example sun light or from lights in adjacent room(s), then the light sensor instructs the switch unit to turn the night light off, turn the room light off, dim the room light or any combination thereof.

In accordance with further embodiments of the invention, a lighting control system includes a control module. The control module is electrically coupled to a load circuit for controlling and powering outdoor lights. The control module includes a night light unit with a night light source, which can be an LED light source, an incandescent light source, a fluorescent light source, a halogen light source or any combination thereof. The night light unit and the light source are controlled using or more sensor units, such as a light sensor unit and/or a motion sensor unit.

In accordance with the embodiments of the invention, the lighting control system can also be turned on and off and/or controlled through one or manual switches. For example, a manual switch on the control module can be used to turn on and off and/or control the lighting control system. Alternatively, or in addition to the manual switch on the control module, the lighting control system can include an in-line manual switch that is electrically coupled to the control module thorough the load circuit. The in-line manual switch can be configured to turn on and off the outdoor lights and can also be configured to select a mode of operation of the lighting control system, such as described below.

In operation, the control module is configured to open and close the load circuit in response to control signals generated by the one or more sensor units. The lighting control system can be configured to automatically turn on at a selected time and/or in response to outdoor lighting conditions in an area corresponding to the control module. For example, the lighting control system can be configured to automatically turn on and go into a night light mode from the hours of 6 PM to 6 AM and/or when the light sensor unit detects light levels that are below a preset or selected threshold value. In the night light operating mode, the night light unit powers the night light source at the selected or programmed time and/or when the light levels detected by the light sensor unit are below the threshold value. The motion sensor monitors motion in an area corresponding to the motion sensor unit. When the motion sensor unit detects motion above a threshold level, the motion sensor unit generates control signals that instruct the night light unit to shut off the night light source and the control module to close the load circuit and turn on the outdoor lights. Preferably, the outdoor lights are configured to illuminate an area corresponding to a location where the motion is detected. After a duration of time that motion is either not detected or motion is detected at levels below the threshold level by the motion senor unit, the motion senor unit generates control signals that instruct the control module to open the load circuit and shut off the outdoor lights, and simultaneously instructs the night light unit to turn on the night light source.

In accordance with the embodiments of the invention, the lighting control system can be programmed in any number of different ways. For example, the lighting control system has a micro-processor with a user interface, such as a keyboard and/or a micro-switch that allow a user to select and set various parameters, programs and/or modes of operation, such as the time when the lighting control system turns on and goes into night light operation mode and the duration of time that the outdoor light remains on after motion is detected by the motion sensor unit. In accordance with further embodiments of the invention, the mode of operation of the lighting control system can be selected with the in-line manual switch. For example, moving the in-line manual switch through a plurality of off/on sequences within a predetermined duration of (e.g., 2 seconds), the lighting control system can be configured to go into an override mode, whereby control signals from the one or more sensor units are ignored or blocked and the control module keeps the load circuit closed and the outdoor lights on for a predetermined duration of time (e.g., 4 hours). After the outdoor lights have stayed on for the predetermined period of time, the lighting control system then reverts to night light operation mode, such as previously described. The in-line manual switch and/or the control module can also be equipped with an indicator means, such as one or more LED lights, that flashes, displays or otherwise indicates the mode of operation of the lighting control system.

BRIEF DESCRIPTION OF THE DRAWINGS

FIG. 4 shows a table of selectable modes of operation for a light management system, in accordance with the embodiments of the invention.

DETAILED DESCRIPTION OF THE INVENTION

There are a number of situations where a minimal or a reduced amount of room lighting is preferred. For example, during the night people often prefer to have a night light in a hallway, bathroom or bedroom. To fulfill this need, night lights are often plugged into electrical outlets of hallways, bathrooms or bedrooms.

In hotels, where there is a large number of rooms, conventional plug-in night lights are impractical for several reasons. Since they are not fixed to the wall they tend to get lost, broken or stolen. Even if plug-in night lights could be effectively fixed to the electrical outlets, they are generally not configured to operate on as needed basis and require that occupants turn them on and off. Further, most plug-in night lights do not generate a sufficient amount of low level light to allow occupants to navigate through hotel rooms at night.

Hotel rooms tend to be extremely dark. To maintain a low level of light during the night hours, to allow occupants to navigate through unfamiliar quarters, or merely for comfort reasons, occupants of a hotel room will often leave a bathroom light on all night with the bathroom door ajar by an amount sufficient to provide the desired amount of night light. In a large hotel and where each bathroom light can have a number of incandescent bulbs, such behavior results in a considerable waste of energy and cost to the proprietor.

The current invention is directed to a light management system for adjusting room lighting based on occupation of the room and is especially configured for providing reduced or low level room lighting from a night light. The system of the present invention couples to a load circuit with a room light and operates the room light and the night light in a concerted manner, as described below.

Figure 1:
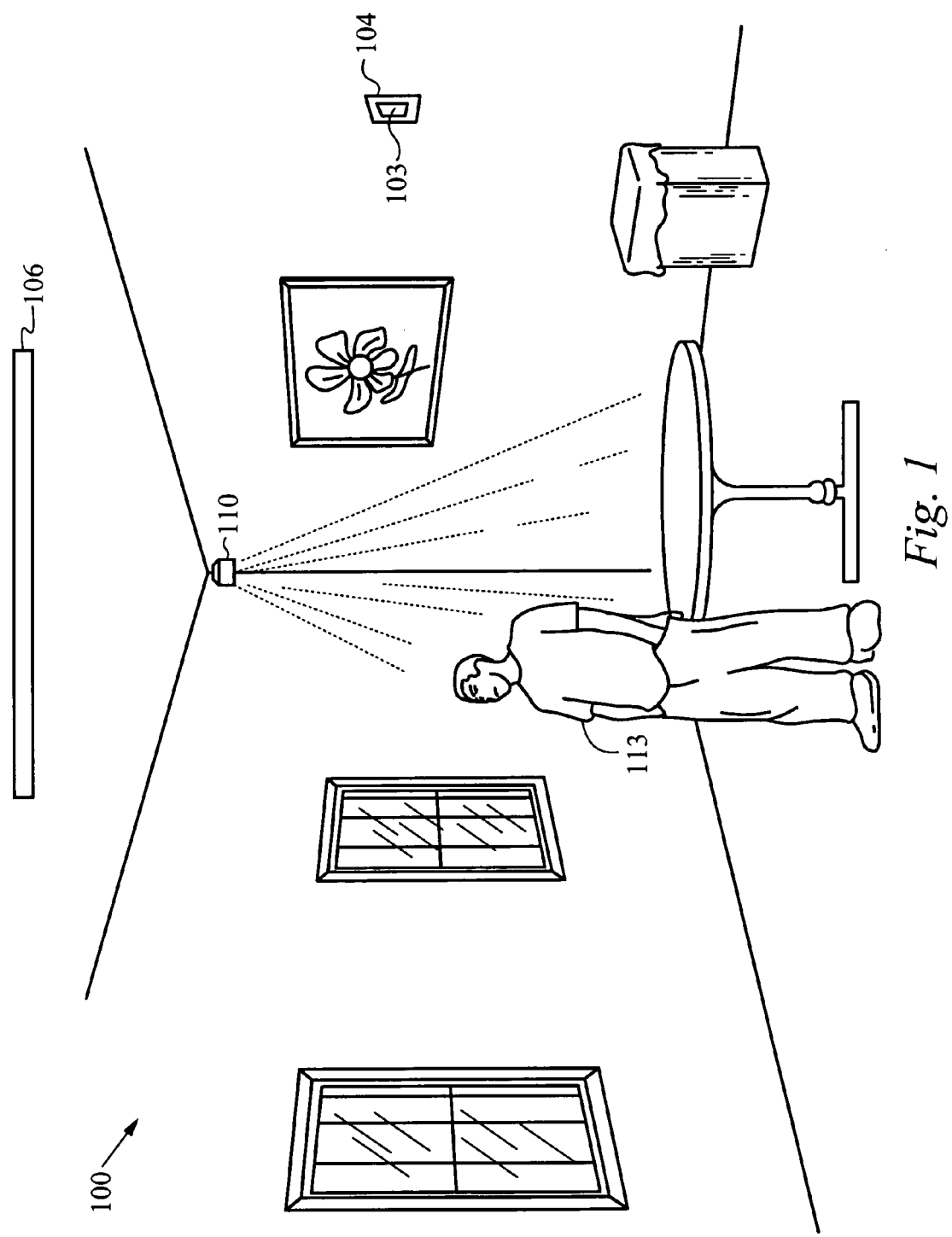
FIG. 1 shows a perspective view of a room with a motion sensor and a manual switch for controlling a room light.

FIG. 1 shows a perspective view of a room 100 with a light management system. The system comprises a sensor 110 for sensing the presence of a person 113 within the room 100. The system 100 also has a switch unit 104 with manual switch 103 for manually turning on and off the room light 106. The sensor 110 is coupled to the room light 106 and is configured to turn on and off and/or dim the room light 106 based on detected occupation of the room.

Figure 2:
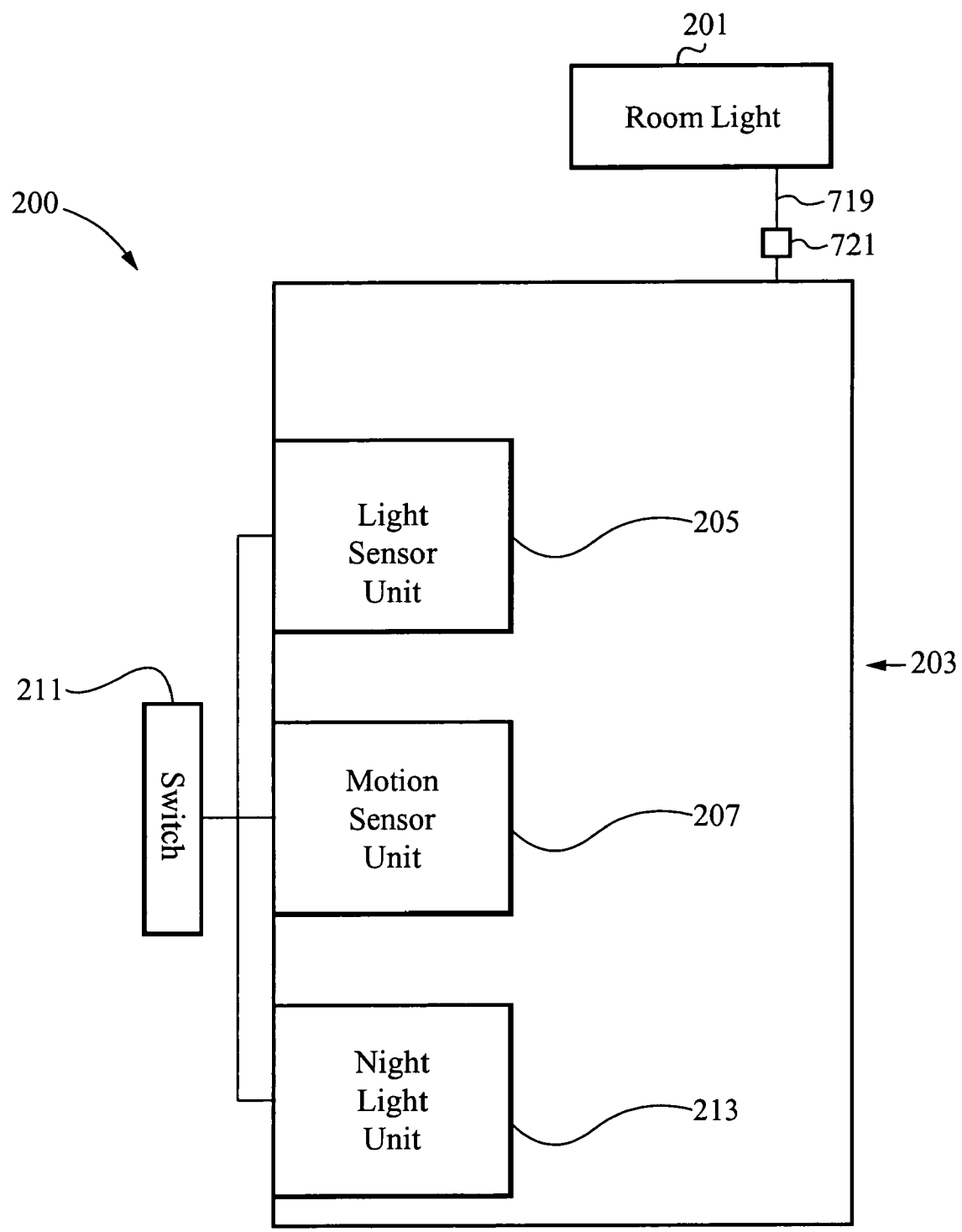
FIG. 2 shows a schematic block diagram of a light management system, in accordance with the embodiments of the invention.

Now referring to FIG. 2, a light management system 200 in accordance with the embodiments of the present invention, preferably comprises a housing unit 203, for coupling to the wall receptacle and a manual wall switch 211 for manually operating a room light 201, such as an overhead light fixture or a wall light fixture. The system 200 preferably further comprises a night light unit 213, such as a night light, configured to provide reduced or low level room lighting when the room light 201 is off. In addition to the manual switch 211 and the night light unit 213, the system 200 preferably comprises a sensor 207 that is configured to operate or adjust room light 210 and/or the night light unit 213 based on a detected occupancy of the room. Preferably, the sensor 207 is a motion sensor configured to operate or adjust the room light 210 and/or the night light unit 213 based on a level of detected motion within the room, or a lack thereof, as explained in detail below.

Still referring to FIG. 2, the system 200, in accordance with further embodiments of the invention, comprises a light sensor unit 205. The light sensor unit 205 is configured to detect a level of room lighting and adjust the room light 201 and/or night light unit 213 based on a level of detected room lighting. The manual switch 211, the night light unit 213, the motion sensor unit 207 and the light sensor unit 205 are integrated to operate collectively in a number of different ways to provide a wide range of modes of operation suitable for a variety of applications. For example, the light sensor unit 205, in accordance with the embodiments of the invention, is configured to override the motion sensor unit 207, such that the room light 210 and/or the night light unit 213 are disabled when there is a sufficient level of room lighting, regardless of whether the room is occupied or not. Accordingly, modes of operation described below are for illustration only and any number of different modes of operation are considered to be within the scope of the present invention.

Figure 3:
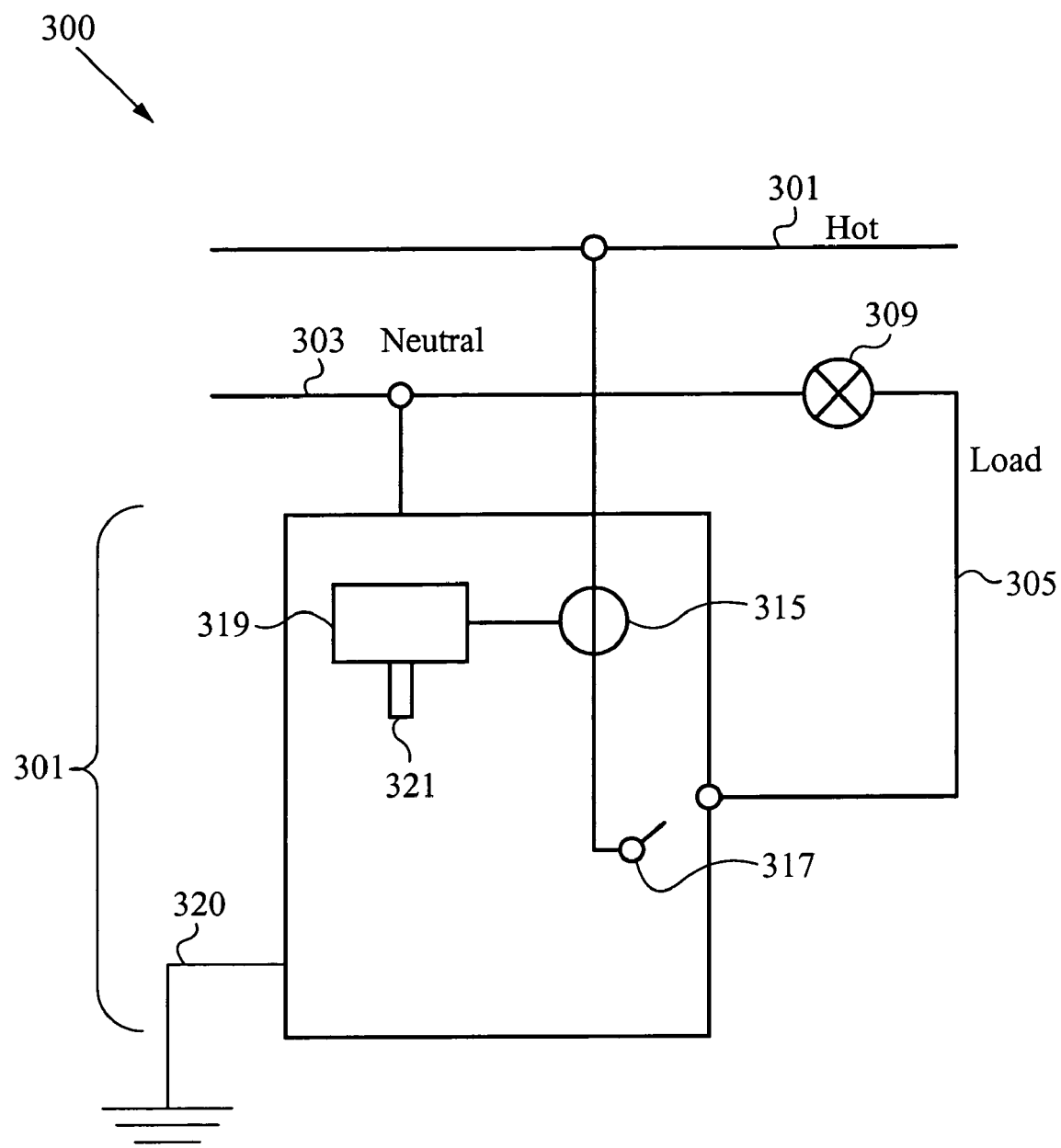
FIG. 3 is a schematic wiring diagram of a light management system, in accordance with the embodiments of the invention.

FIG. 3 shows a schematic wiring diagram of a load circuit 300 with a control system 301, in accordance with the embodiments of the present invention. The control system 301 comprises one or more control units 315 in communication with a circuit switch 317. The control units 315 are configured to open and close the circuit switch 317. Preferably, the control unit 315 includes an infrared motion sensor for detecting motion and for opening and closing the circuit switch 317 based on a level of detected motion. The control unit 315, in accordance with further embodiments of the invention, includes a light sensor, as described above.

The system 301 is coupled to an electrical ground lead 320. The circuit switch 317 is coupled to a neutral lead 302 and a hot lead through the control unit 315, with a load device 309 therebetween, as shown. When the circuit switch 317 is closed current is then drawn through the load device 309 to operate the load device 309. The load device 309 is preferably a light fixture for lighting a room.

Still referring to FIG. 3, the system 301 also preferably has a microprocessor 319 is configured with firmware which allows a user to select modes of operation with a dip switch 321. In accordance with further embodiments of the invention, the micro-processor is coupled to a momentary switch (not shown) which allows the user to select system features within a given mode of operation. For example, the system 310 is configured to allow the user to place the system 301 in program mode by pushing the momentary switch down and holding the momentary switch down for period of time. With the system 301 in program mode, the user programs the light unit (not shown) to shut off in response to ambient light and/or adjusts the level of light emitted by the light unit. When the light unit comprises LEDs, selecting the level of light emitted by the light unit comprises enabling or disabling one or more of the LEDs.

Figure 6:
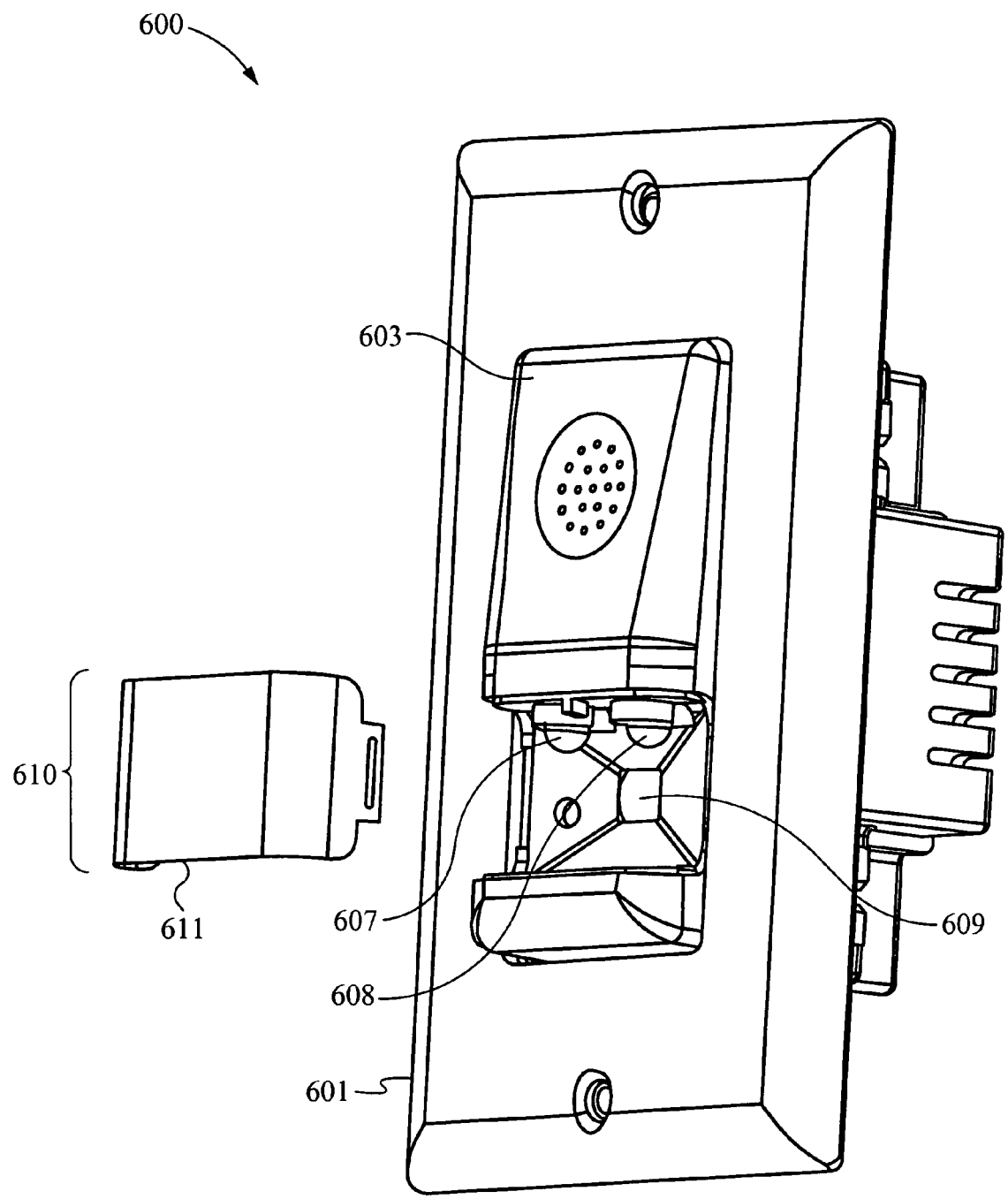
FIG. 6 shows a perspective view of a switch unit with a light unit and motion sensor integrated into a momentary switch, in accordance with a preferred embodiment of the present invention.

FIG. 4 shows a table 400 of modes of operation selectable or programable from the dip switch (FIG. 3) and/or a momentary switch 603 (FIG. 6). In a first mode of operation 401, a load circuit is operated through a manual switch and a night light is shut off when the manual switch closes the load circuit. When the manual switch opens the load circuit, the night light automatically turns on. More importantly, in the event that the load circuit is left closed and a motion sensor does not detect an occupant in the room, then the system will automatically open the load circuit within a prescribed time delay, that is selected at the time of installation or, alternatively, is selectable through the manual switch with the system in program mode, as previously described.

In a second mode of operation 403, the load circuit is configured to automatically close when the sensor unit detects an occupant in the room and automatically shuts the night light off. In event that the load circuit is left closed and a motion sensor does not detect an occupant in the room, then the system will automatically open the load circuit within a prescribed time delay and will simultaneously turn the night light on. In a third mode of operation 405, the load circuit is opened and closed manually through the manual switch. In the event that the load circuit is left closed, and the motion sensor does not detect an occupant in the room, then the system automatically opens the load circuit with a prescribed time delay. In this third mode of operation 405, when the motion sensor detects an occupant in the room, then the system automatically turns the night light on and shuts the night light off after a prescribed time delay when an occupant is no longer detected in the room.

In a fourth mode of operation 407, the system is configured to automatically close the load circuit when the sensor unit senses an occupant in the room and automatically shuts the night light off. In the event that the load circuit is left closed and the motion sensor does not detect an occupant in the room, then the system automatically opens the load circuit within a prescribed time delay and automatically turns the night light on. In addition, a light sensor senses a level of room lighting and the load circuit remains open with the night light off, until the room lighting falls below a selected level and then the system closes the load circuit and/or turns on the night light, as explained above. In yet a fifth mode of operation 409, the system is configured to operate with any combination of the features described for the modes of operation 401, 403, 405, and 407. Also, in accordance with further embodiments of the invention, the system has an internal clock, which allows the system to enable the operation of the night light only during hours of expected darkness. In yet further embodiments of the invention, the system is configured to control a level of current that is drawn through the load circuit, dimming the room light and/or the night light according to the time of day, the level of room lighting, occupation of the room or any combination thereof.

Figure 5:
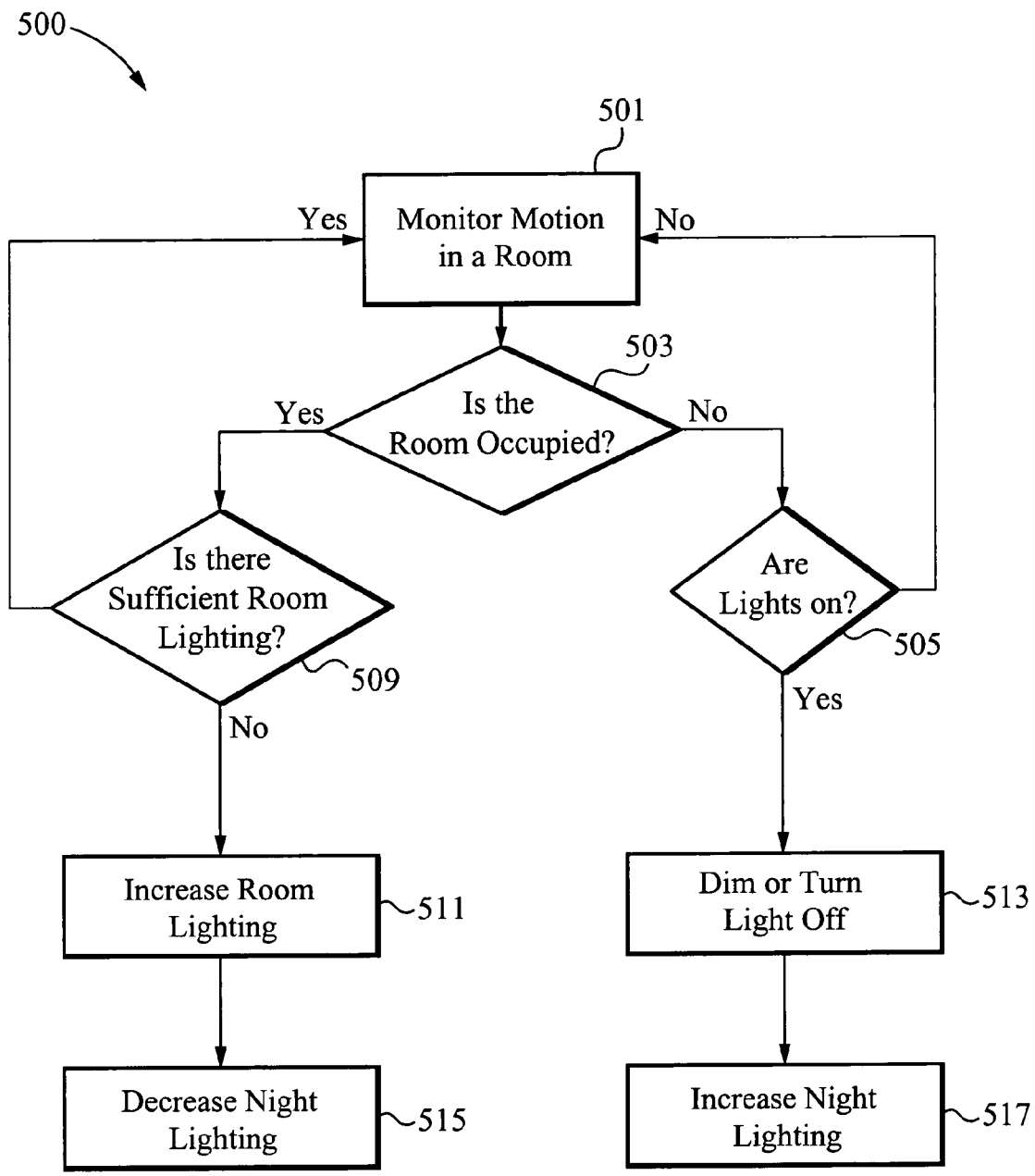
FIG. 5 is a block diagram outlining the steps for controlling room lighting, in accordance with the method of the present invention.

FIG. 5 is a flow chart 500 outlining the steps of a method for managing room lighting, in accordance with the present invention. In the step 501, motion in a room is monitored. Preferably, motion is monitored from a switch unit equipped with an infrared motion sensor for sensing an occupant in the room. However, it will understood by one skilled in the art that occupants in the room can be determined by any number of optical, electrical and mechanical means. While motion is monitored in the step 501, then in the step 503 the system determines whether or not the room is occupied. If in the step 503 the system determines that the room is not occupied, then in the step 505 it is determined if the room light is on. If, in the step 503, the system determines that room light is not on, then the system continues to monitor for motion in the room. If, in the step 505, the system determines that the room light is on, then in the step 513 the room lighting is lowered or reduced by turning off the room light, dimming the room light, turning the night light off, dimming the night light or a combination thereof. Alternatively, or in addition to reducing the level of light emitted from the room light, in the step 517, the level of light emitted from the night light is also increased.

Still referring to FIG. 5, if in the step 503, the system determines that the room is occupied, then in the step 509 the system determines if there is sufficient room lighting. Room lighting, herein, refers to sun light, light from adjacent rooms, light from light fixtures within the room, light from the night light or a combination thereof. A light sensor is preferably configured to sense a level of room lighting and allow the system to determine if the room lighting is sufficient. If in the step 509 the system determines that there is a sufficient level of room lighting, then the system continues to monitor for motion in the room. If however in the step 509, the system determines that there is an insufficient level of room lighting, then in the step 511 the system increases the level of room lighting by increasing the amount of light that is emitted by the room light, the night light of the system or a combination thereof. In accordance with further embodiments of the invention, in the step 509, when making the determination of whether or not there is a sufficient level of room lighting the system takes into account the time of day and specifically whether it is currently during a time of expected darkness. Alternatively, or in addition to increasing the level of light emitted from the room light, in the step 515, the level of light emitted from the night light is also decreased.

FIG. 6 shows a switch unit 600 for coupling to a wall receptacle or wall box and coupling to a load circuit with one or more room lights, also referred to as a primary light source. The switch unit 600 has a face cover 601 for coupling to an electrical wall receptacle and a housing for housing electrical components, wire connections and a microprocessor. In accordance with the embodiments of the invention, the switch unit 600 has a night light unit 610 comprising LEDs 607 and 608 for providing secondary light from the switch unit 600. The exact operation of the night light depends on the mode of operation selected, as explained above.

Still referring to FIG. 6, the switch unit 600 also preferably has a motion sensor 609, that is preferably comprises an infrared motion sensor. The motion sensor 609 and the night light unit 610 comprising the LEDs 607 and 608 are preferably physically integrated into a momentary switch 603 for manually opening and closing the load circuit. The night light unit 610 also preferably comprises a lens 611 configured to cover the LEDs 607 and 608 and the motion sensor 609, in order to protect the motion sensor 609 and to diffuse light emitted from the LEDs 607 and 608.

Figure 7:
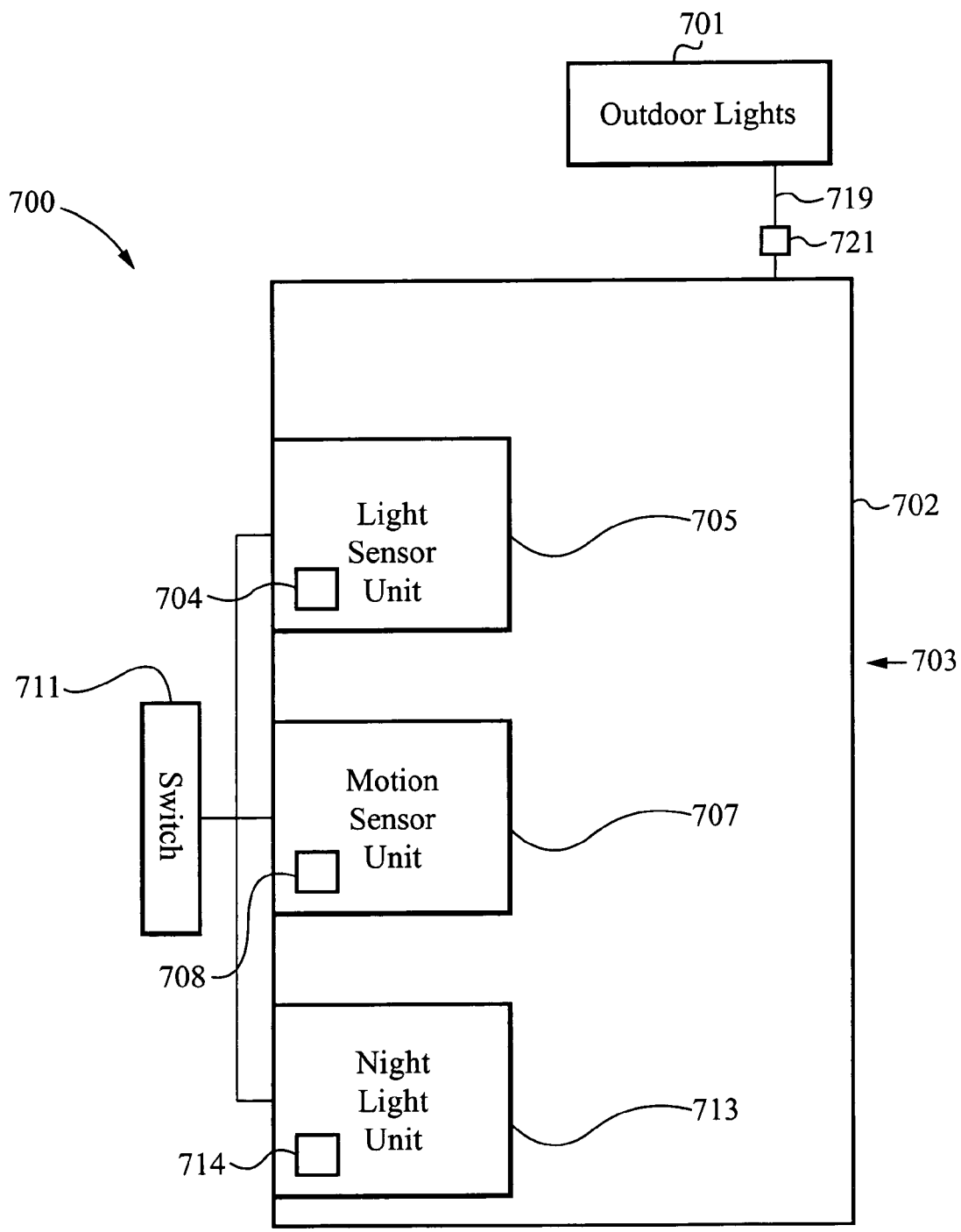
FIG. 7 shows a schematic block diagram of a outdoor light management system, in accordance with the embodiments of the invention.

In accordance with further embodiments of the invention, a lighting control system 700 shown in FIG. 7 includes a control module 703 with a housing structure 702 that preferably fits into an electrical wall box. The control module 703 is electrically coupled to a load circuit 719 for controlling and powering outdoor lights 701. The control module 703 includes a night light unit 713 with a night light source 714, which can be an LED light source, an incandescent light source, a fluorescent light source, a halogen light source or any combination thereof. The night light unit 713 and the light source 714 are controlled using one or more sensor units, such as a light sensor unit 705 with a light sensor 704 and/or a motion sensor unit 707 with a motion sensor 708. The light sensor 704 is, for example, a photodiode light sensor and the motion sensor 714 is, for example, an infrared motion sensor.

Figure 8:
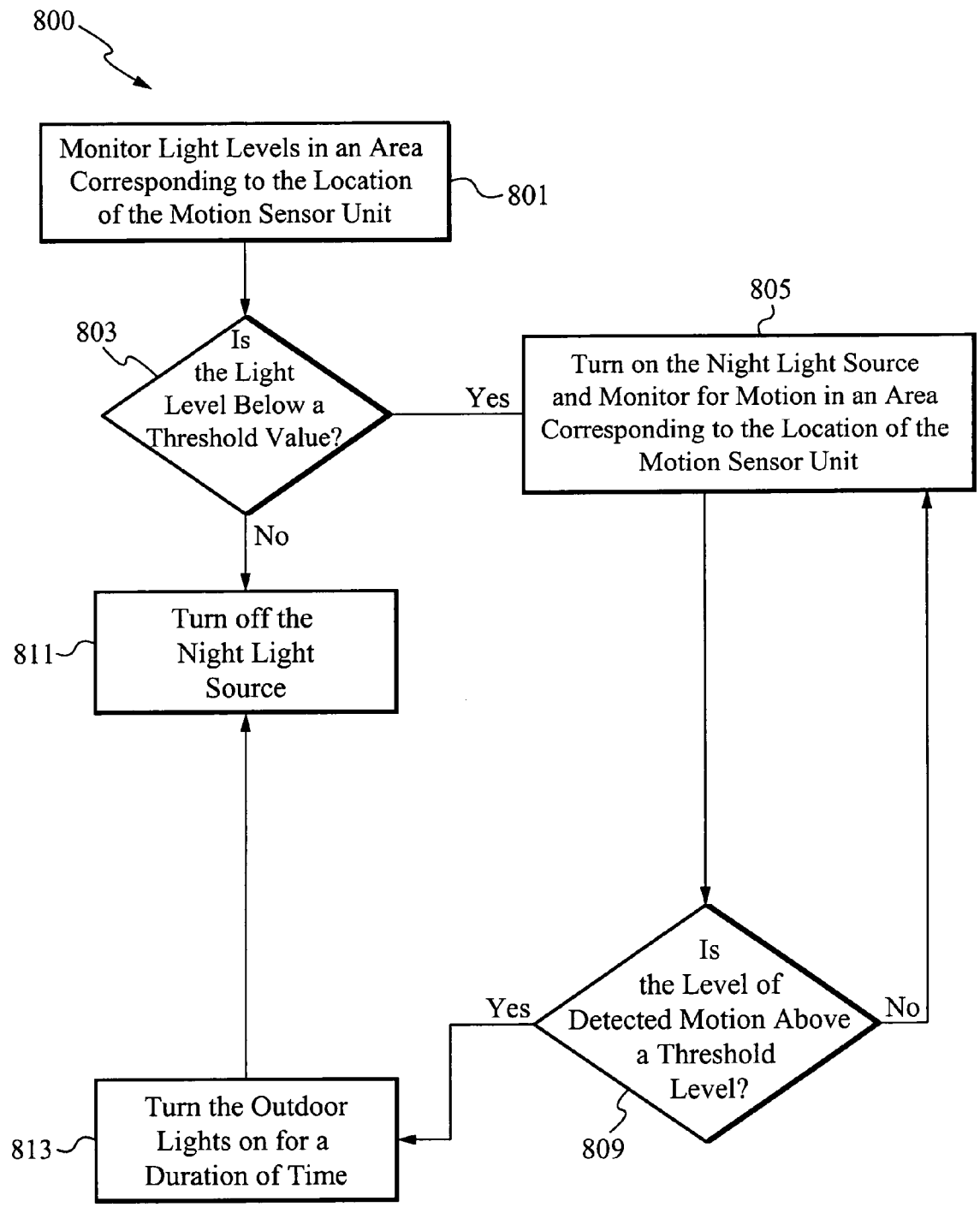
FIG. 8 is a block diagram outlining the steps for controlling outdoor lights, in accordance with the method of the present invention.

In accordance with the embodiments of the invention, the lighting control system 700 can also be turned on and off and/or controlled through one or manual switches 711 and 721. For example, the manual switch 711 on the control module 703 can be used to turn on and off and/or control the lighting control system 700. Alternatively, or in addition to the manual switch 711 on the control module 703, the lighting control system 700 can include an in-line manual switch 721 that is electrically coupled to the control module 703 through the load circuit 719. The in-line manual switch 721 can be configured to turn on and off the outdoor lights 701 and can also be configured to select a mode of operation of the lighting control system 700, such as described below FIG. 8 is a block diagram 800 outlining the steps for controlling the outdoor lights 701 (FIG. 7), in accordance with the method of the present invention. Referring now to FIGS. 7 and 8, in operation the control module 703 is configured to open and close the load circuit 719 in response to control signals generated by the one or more sensor units 705 and 707. The lighting control system 700 can be configured to automatically turn on at a selected time and/or in response to outdoor lighting conditions in an area corresponding to the control module 703. For example, the lighting control system 700 can be configured to automatically turn on and go into night light operation mode from the hours of 6 PM to 6 AM and/or when the light sensor unit 705 detects light levels that are below a preset or selected threshold value.

In the step 801 the light sensor unit 705 monitors light levels in an area corresponding to the lighting control system 700. If the light levels detected by the light sensor unit 705 in the step 803 are below a threshold value, in the step 805, the light sensor generates control signals instructing the night light unit 713 to turn on the night light source 714 and go into night light operating mode. If in the step 803 the light level that is detected by the light sensor unit 705 is above the threshold value, then in the step 811 the lighting control system 700 remains in a standby operating mode with the night light source 704 turned off.

With the night light source 714 is turned on in the step 805 and with the lighting control system 700 in night light operating mode, the motion sensor unit 707 monitors for motion in an area corresponding to an area in the location of the motion sensor unit 707. If in the step 809 the level of motion detected by the motion sensor unit 707 is below a threshold value, in the step 805 the lighting control system 700 stay in night light operating mode and the motion sensor unit continues to monitor for motion in the area corresponding to the location motion sensor unit 707. If in the step 809 the motion that is detected by the motion sensor unit 707 is above the threshold value, in the step 813 the lighting control system 700 turns on the outdoor lights 701 for a predetermined or selected duration of time and turns the night light source 714 off for the duration of time. After the duration of time has elapsed and the level of motion detected by the motion sensor unit is below the threshold value, in the step 805 the light control system 700 turns the outdoor lights 701 off and turns the night light source 714 on and reverts back to night light operating mode as described for the step 805.

The present invention provides for the ability to manage room lighting or outdoor lighting efficiently. The system of the present invention provides for the ability to manage lighting using a system that is configured to automatically control light output based on detected motion, time of day, detected levels of light or any combinations thereof.

The indoor system of the present invention is particularly well suited for reducing energy usage for room lighting in high occupancy facilities, such as hotels, motels and the like, wherein occupants are required to sleep in unfamiliar surroundings, require low level room lighting at night and where occupants are not generally considerate of energy conservation measures. Because the system of the present invention is programmable, the system is readily adaptable for a wide variety of different applications including use in residential housing and commercial buildings.

The outdoor system is particularly well suited for providing low level lighting outdoors, such that building addressees, egresses and other building structure can be visible from a distance with the night light and then for providing more intese lighting when a user is dected in a motinored area of the outdor system.

While the present invention has been described in terms of specific embodiments incorporating details to facilitate the understanding of the principles of construction and operation of the invention. As such, references, herein, to specific embodiments and details thereof are not intended to limit the scope of the claims appended hereto. It will be apparent to those skilled in the art that modifications can be made in the embodiment chosen for illustration without departing from the spirit and scope of the invention.

What is claimed is:

1. A control system for controlling outdoor lighting comprising a control module for mounting in an electrical box, the control module comprising:
    a) a light sensor for measuring ambient light levels;
    b) a motion sensor for detecting motion in an area of the control module; and
    c) an integral night light,
    wherein the control module is electrically coupled to a load circuit and automatically turns on the night light when the ambient light levels measured by the light sensor are below a threshold value and simultaneously automatically closes the load circuit when motion detected by the motion senor is above the threshold value, thereby turning on the outdoor lighting for a duration of time.

2. The control system of claim 1, wherein the control module is configured to automatically open the load circuit after the duration of time.

3. The control system of claim 2, further comprising a micro-processor for programming the duration of time.

4. The control system of claim 3, further comprising a manual switch for opening and closing the load circuit.

5. The control system of claim 4, wherein the system is placed in a night light mode through the manual switch.

6. The control system of claim 4, wherein the microprocessor is programmable through the manual switch.

7. The control system of claim 1, wherein the light sensor comprises a photo-diode.

8. The control system of claim 1, wherein the motion sensor comprises an infrared sensor.

9. The control system of claim 1, wherein the integral night light comprises a light emitting diode.

10. The control module of claim 1, wherein the motion sensor comprises an infrared sensor.

11. A control module for electrically coupling to a load circuit with a light through an electrical switch box, the control module comprising:
    a) an integral night light, wherein the integral night light emits light when the load circuit is in a opened position;
    b) light sensor for detecting levels of ambient light and automatically controlling the integral night light based on the levels of detected ambient light; and
    c) a motion sensor unit for automatically controlling the night light and the load circuit in response to a level of detected motion when the control module is in a night light operating mode.

12. The control module of claim 11, further comprising means for selecting and programming a duration of time that the load circuit remains closed after levels of motion is detected are above threshold values, wherein after the duration of time has elapsed and levels of motion detected are below the threshold values, the control module automatically opens the load circuit.

13. The control module of claim 12, wherein the means for selecting and programming the duration of time includes a micro-processor.

14. The control module of claim 11, further comprising a manual switch manually controlling an electrical load through the load circuit, wherein the night light automatically turns off when the load circuit is closed using the manual switch.

15. The control module of claim 11, wherein the light sensor unit comprises a photo-diode.

16. A method of making a light controller comprising:
    a) providing a housing structure that is configured to fit into an electrical wall box; and
    b) integrating a night light, a motion sensor and a light sensor in a housing structure, such that the light controller is configured to couple to a load circuit and automatically turns on the night light when the ambient light levels measured by the light sensor are below a threshold value and simultaneously automatically closes the load circuit when motion detected by the motion sensor is above the threshold value, thereby turning on the outdoor lighting for a duration of time.

17. The method of claim 16, further comprising integrating a manual switch into the light controller, wherein the manual light switch is configured to open and close the load circuit.

* * * * *